United States Patent Office 3,136,803
Patented June 9, 1964

3,136,803
SULFONYLOXY SUBSTITUTED
ALKYLENEDIAMINES
John Anthony Carbon, Waukegan, Ill., assignor to Abbott Laboratories, North Chicago, Ill., a corporation of Illinois
No Drawing. Filed Aug. 7, 1961, Ser. No. 129,515
6 Claims. (Cl. 260—456)

This invention is directed to new substituted alkylenediamines which correspond to the formula

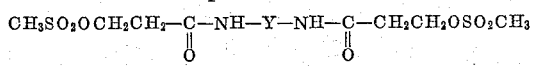

wherein Y is a straight or branched alkylene radical containing from one to six carbon atoms, inclusive, and methods for their preparation. These compounds are white, crystalline solids soluble in most organic solvents. They exhibit growth inhibiting properties especially against pathogenic organisms and living tissue. In particular, the compounds of the present invention are useful as anthelmintics and can be employed as a vermifuge in the practice of veterinary medicine. In a representative operation, N,N'-bis(3-methanesulfonyloxypropanoyl) tetramethylenediamine when incorporated into feed and orally administered at a dosage of 50 mg. per kg. of body weight to mice heavily infested with *Syphacia obvelata* resulted in complete control of pinworms. If desired, the compounds of the present invention can likewise be incorporated into other liquid or solid carriers such as water, alcohol or talc and administered by injection or gavage in ways well known to those skilled in the art.

The new compounds can be readily prepared by the reaction of one molecular proportion of an N,N'-bis(3-bromopropanoyl)alkylenediamine with at least two molecular proportions of silver methanesulfonate. In carrying out the reaction, a mixture of the reactants in dry acetonitrile is refluxed for about 20 hours to complete the reaction. The silver bromide of reaction is removed by filtration and the filtrate evaporated to dryness. The residue is extracted with an organic solvent such as ethanol and the extract concentrated. Upon cooling the concentrate, the desired product precipitates and is recrystallized from ethanol or dioxane.

The following examples illustrate the invention but are not to be construed as a limitation thereof.

EXAMPLE 1

N,N'-Bis(3-Methanesulfonyloxypropanoyl)-
Methylenediamine

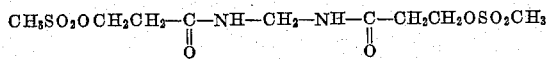

A mixture of 0.05 mole (15.8 g.) of N,N'-bis(3-bromopropanoyl)methylenediamine and 0.11 mole (22.4 g.) of silver methanesulfonate in 100 ml. of dry acetonitrile was stirred and refluxed for 15 hours. The reaction mixture was then filtered to remove the silver bromide of reaction and the filtrate evaporated to dryness under vacuum. The residue was extracted with hot ethanol and the extract concentrated. Upon cooling, the desired product precipitated and after recrystallization from ethanol melted at 159° C. It contained 7.71% nitrogen compared to the calculated value of 8.09% nitrogen.

In a similar manner, other N,N'-bis(3-bromopropanoyl) alkylenediamines were reacted with silver methanesulfonate in acetonitrile to obtain the corresponding N,N'-bis(3 - methanesulfonyloxypropanoyl)alkylenediamines shown in the following table wherein Y in the general formula is as indicated therein.

| Example No. | Y | Melting point in ° C. | Percent nitrogen Calc'd | Percent nitrogen Found |
|---|---|---|---|---|
| 2 | —(CH$_2$)$_2$— | 135 | 7.77 | 7.70 |
| 3 | —(CH$_2$)$_3$— | 115 | 7.48 | 7.65 |
| 4 | —(CH$_2$)$_4$— | 139 | 7.21 | 7.12 |
| 5 | —(CH$_2$)$_5$— | 107 | 6.98 | 6.73 |
| 6 | —(CH$_2$)$_6$— | 113 | 6.74 | 6.76 |
| 7 | —CHCH$_2$— <br>       | <br>      CH$_3$ | 114 | 7.48 | 7.08 |

The N,N'-bis(3 - bromopropanoyl)alkylenediamines employed as starting materials in the present invention are known compounds or can be prepared by known methods. The preparation of N,N'-bis(3-bromopropanoyl)methylenediamine is shown in British Patent 726,933. The other N,N'-bis(3-bromopropanoyl)alkylenediamines employed herein are prepared by adding with stirring at room temperature two molecular proportions of 3-bromopropanoyl chloride to an aqueous solution of one molecular proportion of the appropriate alkylenediamine in the presence of at least two molecular proportions of sodium bicarbonate or other hydrohalide acceptor. The desired product is isolated by filtration and recrystallized from water or aqueous ethanol. The melting points of the various compounds corresponding to the formula

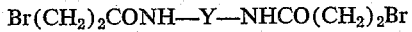

wherein Y is as shown in the table below were as follows:

| Y | Melting point in ° C. | Y | Melting point in ° C. |
|---|---|---|---|
| —CH$_2$— | 185 | —CHCH$_2$— <br>       | <br>      CH$_3$ | 154 |
| —(CH$_2$)$_2$— | 190 | | |
| —(CH$_2$)$_3$— | 161 | | |
| —(CH$_2$)$_4$— | 176 | | |
| —(CH$_2$)$_5$— | 155 | —CHCH$_2$CH$_2$— <br>       | <br>      CH$_3$ | 140 |
| —(CH$_2$)$_6$— | 171 | | |

What is claimed is:
1. Compounds corresponding to the formula

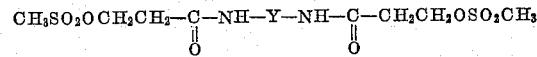

wherein Y is selected from the group consisting of straight and branched alkylene radicals containing from 1 to 6 carbon atoms, inclusive.
2. N,N' - bis(3-methanesulfonyloxypropanoyl)methylenediamine.
3. N,N'-bis(3 -methanesulfonyloxypropanoyl)ethylenediamine.
4. N,N' - bis(3 - methanesulfonyloxypropanoyl)trimethylenediamine.
5. N,N' - bis(3 - methanesulfonyloxypropanoyl)tetramethylenediamine.
6. N,N' - bis(3 - methanesulfonyloxypropanoyl)pentamethylenediamine.

References Cited in the file of this patent
UNITED STATES PATENTS
2,671,105 Sprague et al. _____ Mar. 2, 1954